US012683926B2

(12) United States Patent

Muthuraman

(10) Patent No.: US 12,683,926 B2

(45) Date of Patent: Jul. 14, 2026

(54) SYSTEM TO MANAGE PRIVACY PREFERENCES

(71) Applicant: Wells Fargo Bank, N.A., San Francisco, CA (US)

(72) Inventor: Krishnappan Muthuraman, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 121 days.

(21) Appl. No.: 18/439,138

(22) Filed: Feb. 12, 2024

(65) Prior Publication Data

US 2025/0260665 A1 Aug. 14, 2025

(51) Int. Cl.
*H04L 9/40* (2022.01)
*G06F 21/62* (2013.01)

(52) U.S. Cl.
CPC ...... *H04L 63/0227* (2013.01); *G06F 21/6245* (2013.01)

(58) Field of Classification Search
CPC ........................ H04L 63/0227; G06F 21/6245
See application file for complete search history.

(56) References Cited

U.S. PATENT DOCUMENTS

| | | | | | |
|---|---|---|---|---|---|
| 8,078,233 | B1 * | 12/2011 | Sennett | .................. | H04H 20/59 |
| | | | | | 455/3.06 |
| 8,285,964 | B2 | 10/2012 | Prahlad et al. | | |
| 8,656,456 | B2 | 2/2014 | Maxson et al. | | |

| | | | | | |
|---|---|---|---|---|---|
| 10,169,383 | B2 | 1/2019 | Kishi | | |
| 11,317,247 | B1 * | 4/2022 | Bennati | .................. | G08G 1/012 |
| 2005/0125232 | A1 * | 6/2005 | Gadd | ..................... | G06Q 30/02 |
| | | | | | 704/270.1 |
| 2009/0254511 | A1 * | 10/2009 | Yeap | ..................... | G06F 16/219 |
| | | | | | 715/764 |
| 2010/0292212 | A1 * | 11/2010 | Ackermann | ......... | C07D 471/10 |
| | | | | | 544/70 |
| 2014/0148116 | A1 * | 5/2014 | Alman | .................... | H04W 4/90 |
| | | | | | 455/404.1 |
| 2014/0372200 | A1 * | 12/2014 | Leicher | .................. | G06Q 50/01 |
| | | | | | 705/14.55 |
| 2015/0356639 | A1 * | 12/2015 | Sobhani | ............. | G06Q 30/0635 |
| | | | | | 705/39 |
| 2020/0401708 | A1 * | 12/2020 | Friedman | ............ | G06F 21/6245 |

(Continued)

FOREIGN PATENT DOCUMENTS

CN 111314422 6/2020

*Primary Examiner* — William S Powers

(74) *Attorney, Agent, or Firm* — SCHWEGMAN LUNDBERG & WOESSNER, P.A.

(57) ABSTRACT

A first event stream maintains a plurality of privacy preference data from two or more customer relationship management (CRM) systems. A second event stream maintains a plurality of solicitation preference data, each solicitation preference data in the plurality of solicitation preference data determined by applying a set of rules to filter a respective privacy preference data from the plurality of privacy preference data. A request for a current solicitation preference of a client is received from a CRM system of the two or more CRM systems. One or more entries in the second event stream are accessed. The current solicitation preference of the client is determined from the one or more entries in the second event stream. The current solicitation preference associated with the client is provided to the CRM system.

14 Claims, 8 Drawing Sheets

(56)  References Cited

U.S. PATENT DOCUMENTS

| | | | |
|---|---|---|---|
| 2021/0224262 A1 | 7/2021 | Hermogenes et al. | |
| 2021/0256159 A1* | 8/2021 | Ninglekhu | H04W 4/70 |
| 2025/0125046 A1* | 4/2025 | Nandwana | G16H 40/67 |

* cited by examiner

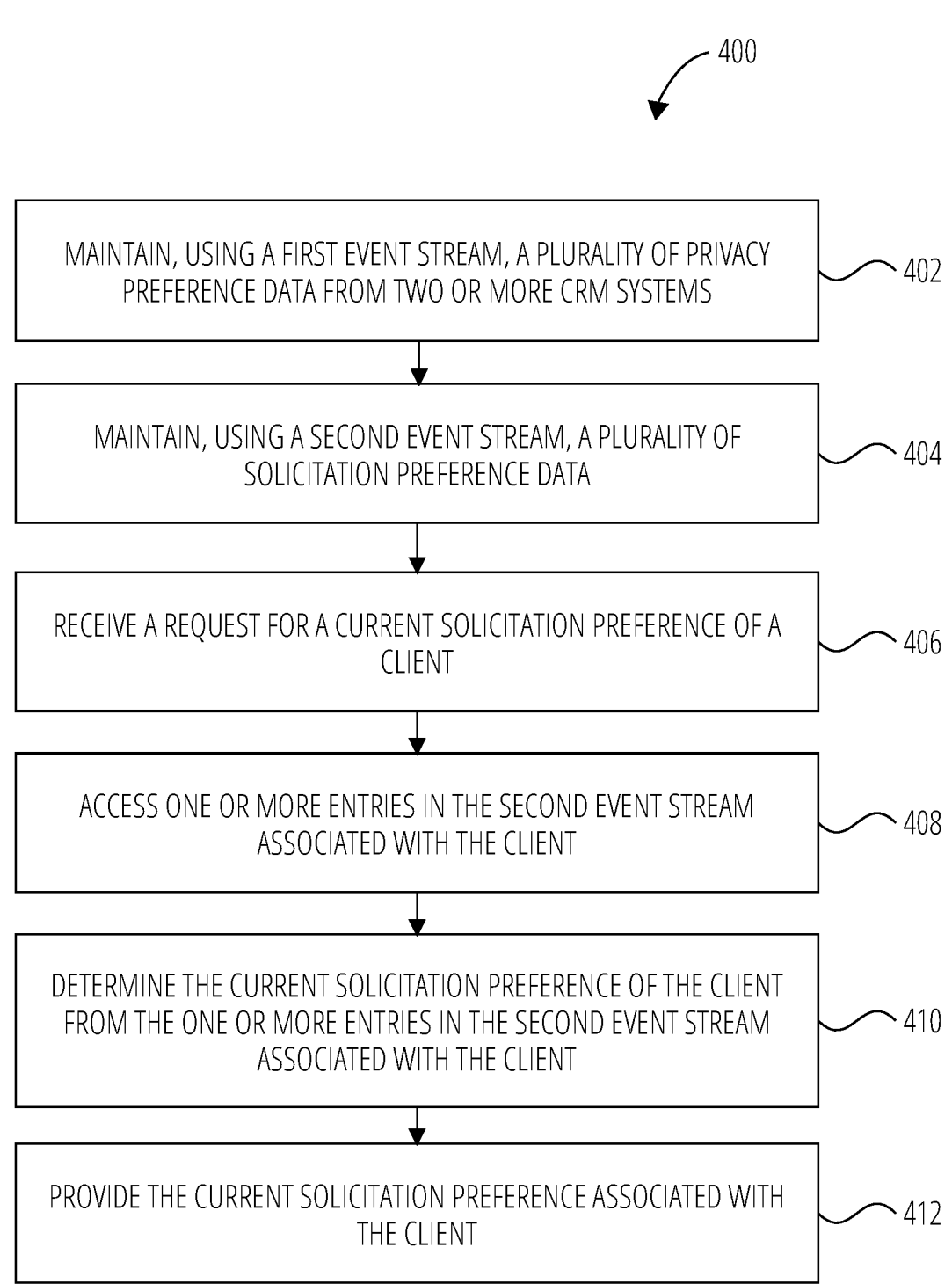

400

MAINTAIN, USING A FIRST EVENT STREAM, A PLURALITY OF PRIVACY PREFERENCE DATA FROM TWO OR MORE CRM SYSTEMS — 402

MAINTAIN, USING A SECOND EVENT STREAM, A PLURALITY OF SOLICITATION PREFERENCE DATA — 404

RECEIVE A REQUEST FOR A CURRENT SOLICITATION PREFERENCE OF A CLIENT — 406

ACCESS ONE OR MORE ENTRIES IN THE SECOND EVENT STREAM ASSOCIATED WITH THE CLIENT — 408

DETERMINE THE CURRENT SOLICITATION PREFERENCE OF THE CLIENT FROM THE ONE OR MORE ENTRIES IN THE SECOND EVENT STREAM ASSOCIATED WITH THE CLIENT — 410

PROVIDE THE CURRENT SOLICITATION PREFERENCE ASSOCIATED WITH THE CLIENT — 412

FIG. 4

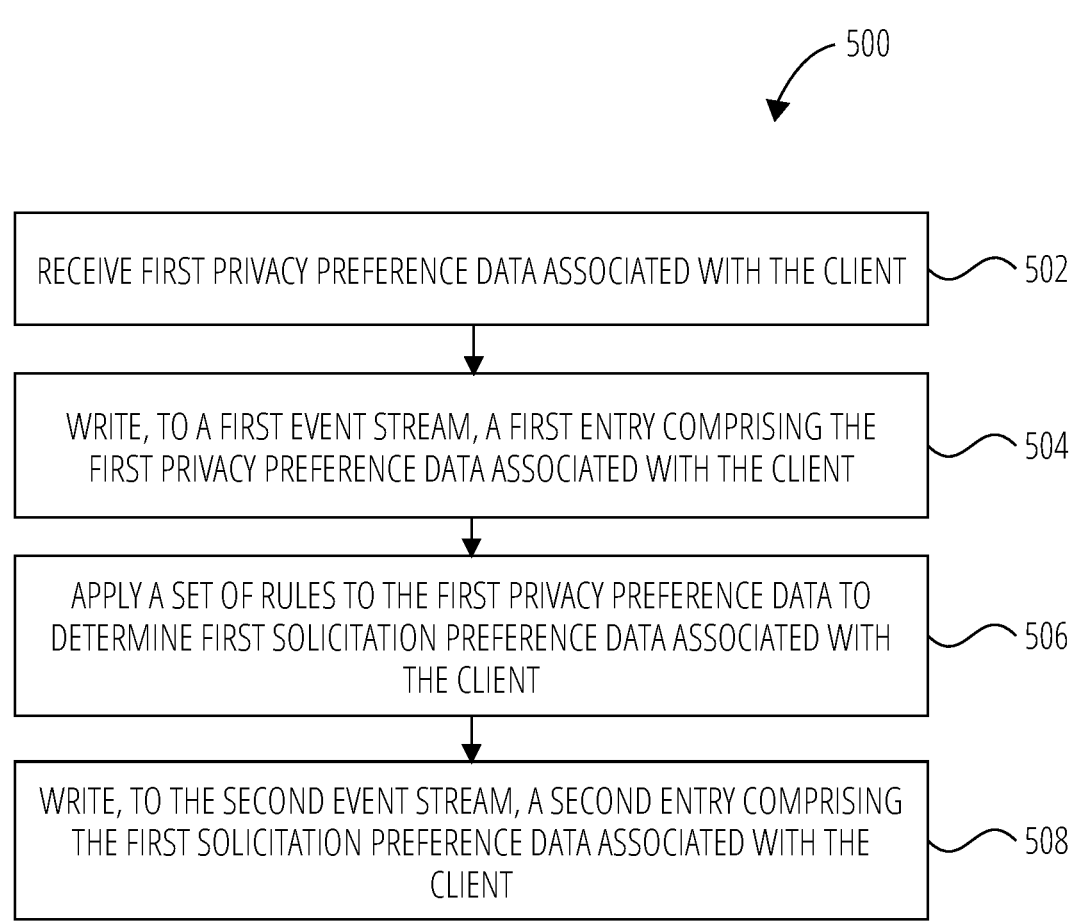

500

RECEIVE FIRST PRIVACY PREFERENCE DATA ASSOCIATED WITH THE CLIENT          502

WRITE, TO A FIRST EVENT STREAM, A FIRST ENTRY COMPRISING THE FIRST PRIVACY PREFERENCE DATA ASSOCIATED WITH THE CLIENT          504

APPLY A SET OF RULES TO THE FIRST PRIVACY PREFERENCE DATA TO DETERMINE FIRST SOLICITATION PREFERENCE DATA ASSOCIATED WITH THE CLIENT          506

WRITE, TO THE SECOND EVENT STREAM, A SECOND ENTRY COMPRISING THE FIRST SOLICITATION PREFERENCE DATA ASSOCIATED WITH THE CLIENT          508

FIG. 5A

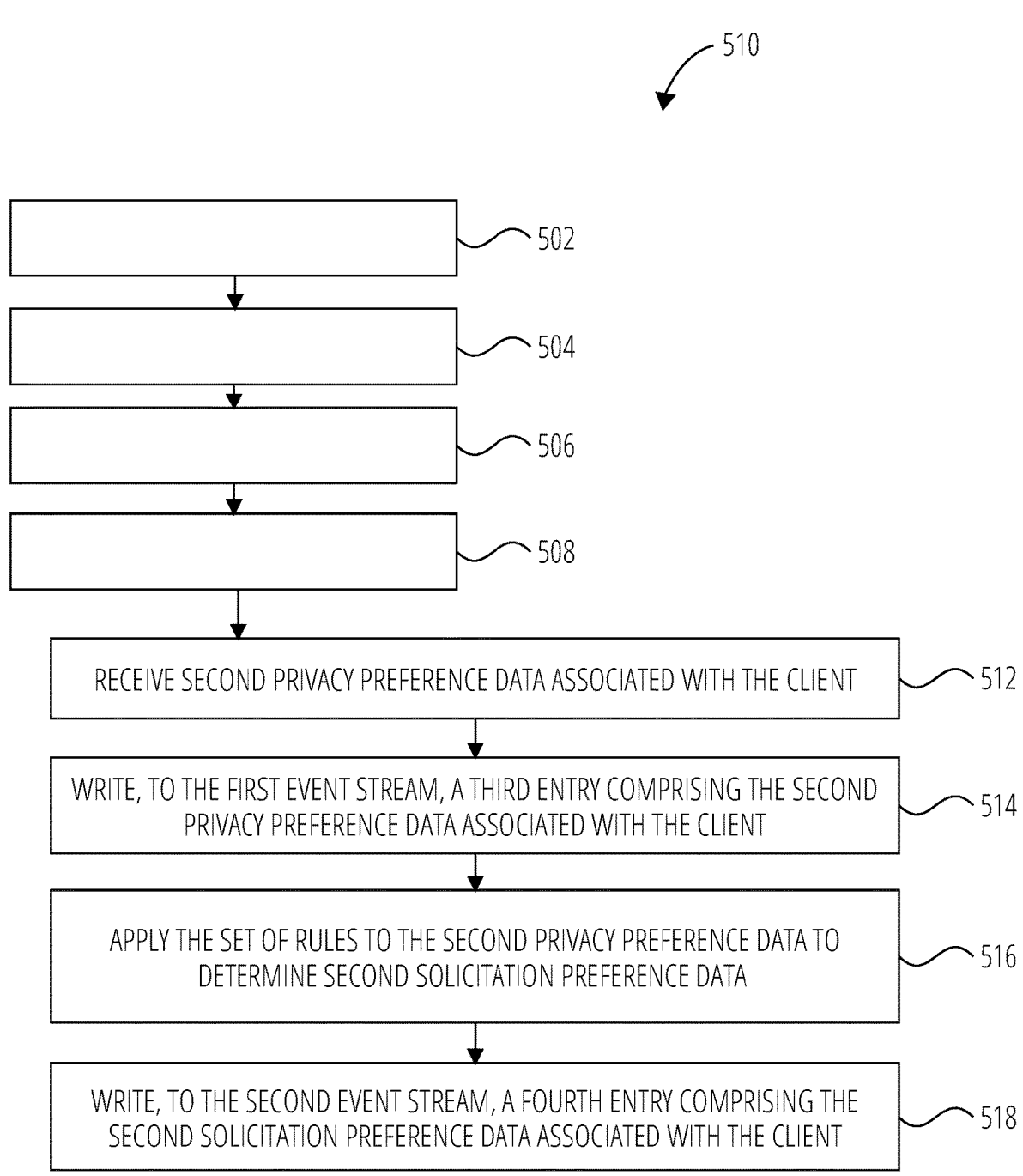

510

502

504

506

508

RECEIVE SECOND PRIVACY PREFERENCE DATA ASSOCIATED WITH THE CLIENT    512

WRITE, TO THE FIRST EVENT STREAM, A THIRD ENTRY COMPRISING THE SECOND PRIVACY PREFERENCE DATA ASSOCIATED WITH THE CLIENT    514

APPLY THE SET OF RULES TO THE SECOND PRIVACY PREFERENCE DATA TO DETERMINE SECOND SOLICITATION PREFERENCE DATA    516

WRITE, TO THE SECOND EVENT STREAM, A FOURTH ENTRY COMPRISING THE SECOND SOLICITATION PREFERENCE DATA ASSOCIATED WITH THE CLIENT    518

FIG. 5B

SYSTEM TO MANAGE PRIVACY PREFERENCES

BACKGROUND

Enterprises maintain and manage consent preferences of clientele, such as individual customers of the enterprise (e.g., users), as well as third parties doing business with the enterprise (e.g., other enterprises). An enterprise must adhere to a client's consent preferences when providing marketing materials to clientele. For example, a client may have a consent preference to receive solicitation through email, but deny consent to be contacted through phone, or fax.

The enterprise may manage consent preferences received from a plurality of sources, such as multiple customer relationship management (CRM) systems. Conventional systems for maintaining consent preferences can fail to timely and accurately update clientele preferences. Discrepancies, duplicates, and errors can arise in the maintained consent preferences. For example, the enterprise may inadvertently send the same marketing email ten times, causing frustration for recipients.

Moreover, the enterprise may have legal requirements for maintaining and adhering to current consent preferences, which can vary by jurisdiction. Clientele may take legal action against an enterprise for violating consent preferences. Conventional systems for managing customer consent preferences are inadequate for maintaining current preferences and expose enterprises to liability.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a flowchart showing a technique for preference management, according to some examples.

FIG. 5A illustrates a flowchart showing a technique for preference management, according to some examples.

FIG. 5B illustrates a flowchart showing a technique for preference management, according to some examples.

DETAILED DESCRIPTION

The systems, methods, and techniques described herein may be used by an enterprise to maintain and manage current consent preferences of clientele from one or more CRM systems, such as privacy preference(s) and solicitation preference(s). Privacy preferences may include preferences of a client to seclude themselves or information about themselves selectively. Solicitation preferences may include preferences of a client to be contacted for solicitation, such as marketing solicitations.

The systems, methods, and techniques described herein may include a repository to store contact information, including privacy preference, as well as an engine for applying rules to the privacy preference to determine solicitation preference. The repository can write new or updated privacy preference of a client to a first event stream. The engine receives data written to the first event stream and applies the rules to the most recent entry to determine the associated solicitation preference. The engine writes the determined solicitation preference to a second event stream. The current privacy preference and solicitation preference associated with a client can be determined by accessing the current entries in the first event stream and second event stream, respectively.

The systems, methods, and techniques described herein may improve veracity of maintained consent preference, which can improve client experiences and reduce liability and risk for the enterprise. The systems, methods, and techniques described herein may reduce both under communication and over communication with clientele.

Figure 1:
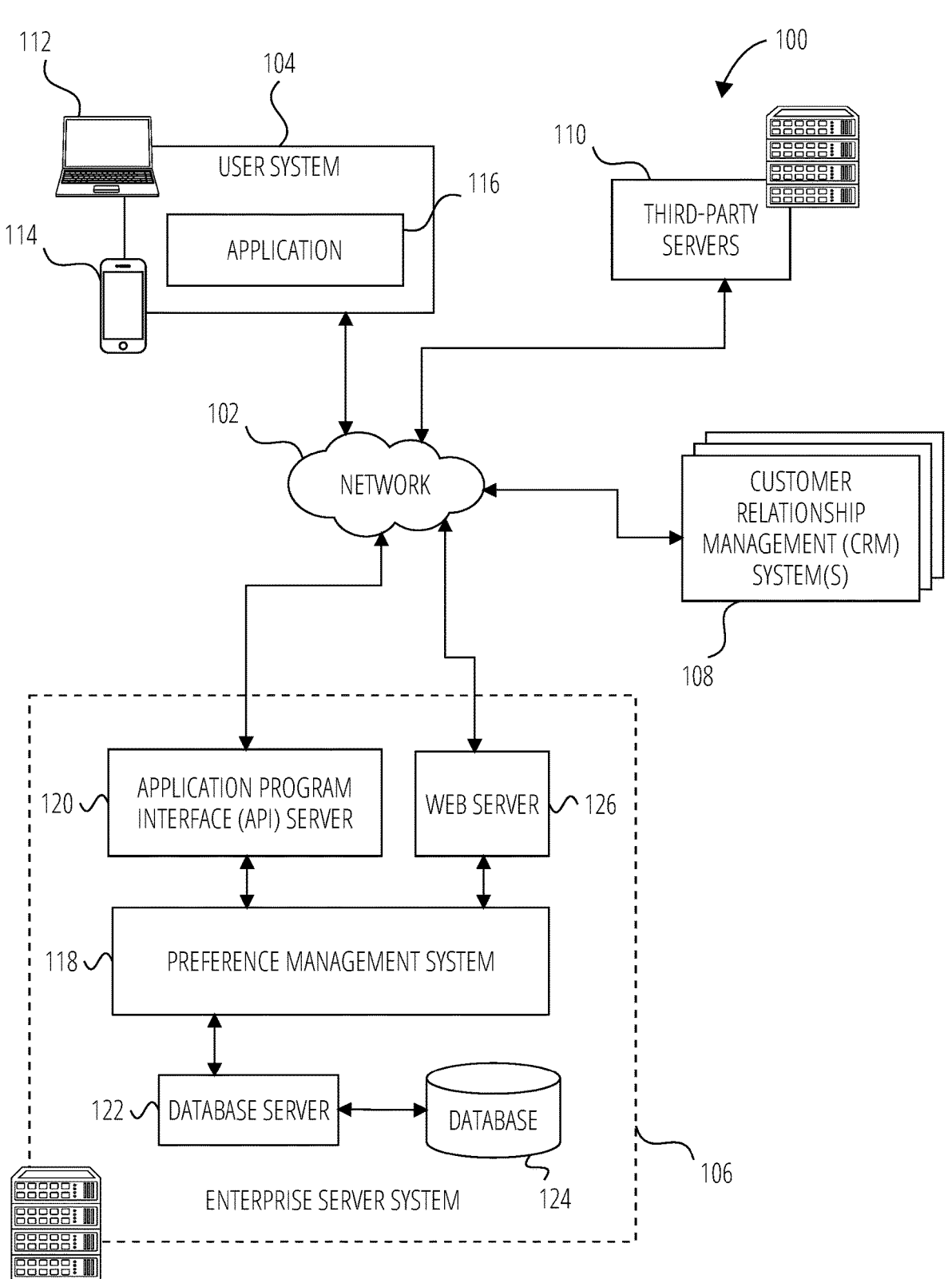
FIG. 1 is a diagrammatic representation of a networked environment in which the present disclosure may be deployed, according to some examples.

FIG. 1 is a diagrammatic representation of a networked environment in which the present disclosure may be deployed, according to some examples. FIG. 1 includes a block diagram showing an example consent preferences system 100 for communicating over a network 102 (e.g., the Internet). The consent preferences system 100 can include one or more user systems 104. According to some examples, each user system 104 is communicatively coupled, via one or more communication networks including the network 102, to an enterprise server system 106, one or more CRM systems 108, and, optionally, third-party servers 110. Additional systems not shown in FIG. 1 may be included in the consent preferences system 100.

The user system 104 can be used by a client (e.g., customer) or prospective client of the enterprise, such as an individual user or a representative user representing an organization (e.g., another enterprise, a non-profit, a government agency, an academic institution, or other third party). The user system 104 can include one or more user devices, such as a computer device 112 or a mobile device 114, that are communicatively connected to exchange data (e.g., via the network 102). According to some examples, the computer device 112 is an automated teller machine (ATM).

The user system 104 can host at least one application 116. The application 116 may be a local instance of a client application of the enterprise, a client application of a CRM system 108, or a web browser application. The application 116 can communicate with other locally hosted applications 116 using APIs and can communicate with the network 102 via the user system 104.

The user system 104 can interact with the enterprise server system 106, the CRM systems 108, and the third-party servers 110 via the network 102. The data exchanged between the user systems 104, the CRM systems 108, the third-party servers 110, and the enterprise server system 106 over the network 102 can include functions (e.g., commands to invoke functions) and payload data (e.g., files, text, audio, video, or other data).

The consent preferences system 100 can include one or more CRM systems 108. A CRM system 108 is a third-party software-as-a-service (SaaS) and can provide various services and operations to manage data about relationships between an enterprise and clients, including prospective clients. The enterprise may use a plurality of CRM systems 108 to manage different clients. For example, the enterprise may use a first CRM system 108 specialized for small businesses and a second CRM system 108 specialized for government entities.

CRM systems 108 may receive and manage contact information of customers (e.g., users), such as names emails, phone numbers, fax numbers, and other contact mediums. CRM systems 108 may manage additional customer data such as demographic and location data, sales history data, prior communications, and other relevant data about customers. CRM systems 108 may provide functionality to streamline sales, data analytics, and data storage (e.g., a database associated with the CRM system 108). A CRM system 108 may receive data from a user system 104. A CRM system 108 can communicate any of the aforementioned data to the enterprise server system 106 via the network 102.

The enterprise server system 106 provides server-side functionality via the network 102 to the user systems 104. While certain functions of the consent preferences system 100 are described herein as being performed by either by the enterprise server system 106 or subsystems thereof, the location of certain functionality either within the enterprise server system 106 or the application 116 of the user system 104 may be a design choice. For example, it may be technically preferable to initially deploy particular technology and functionality within the enterprise server system 106 but to later migrate this technology and functionality to the application 116 where a user system 104 has sufficient processing capacity. Additionally, or alternatively, the enterprise server system 106 is able to provide, store, and modify device-side data (e.g., browser cookies, web storage such as local or session storage).

The enterprise server system 106 supports various services and operations. Such operations include receiving requests from, transmitting data to, receiving data from, and processing data from the user system 104 and the one or more CRM systems 108. This data may include payload data, device information, geolocation information, passwords and user information, among other information. Data exchanges within the consent preferences system 100 are invoked and controlled through functions available via user interfaces (UIs) of the user system 104.

Turning now specifically to the enterprise server system 106, an Application Program Interface (API) server 120 is connected to and provides programmatic interfaces to a preference management system 118 making the functions of the preference management system 118 accessible to the one or more CRM systems 108, user systems 104, and third-party servers 110, as applicable. The preference management system 118 is communicatively coupled to a database server 122, facilitating access to a database 124 that stores data associated with the preference management system 118. Similarly, a web server 126 is coupled to the preference management system 118 and provides web-based interfaces of the preference management system 118. To this end, the web server 126 processes incoming network requests over the Hypertext Transfer Protocol (HTTP) and several other related protocols. According to some examples, the API server 120 and web server 126 are subsystems of the preference management system 118.

The API server 120 receives and transmits data between the preference management system 118 and the one or more CRM systems 108. The API server 120 may receive and transmit data between the preference management system 118 and the user system 104 (e.g., the application 116) or the third-party servers 110, as applicable. Specifically, the API server 120 provides a set of interfaces (e.g., routines and protocols) that can be called or queried to invoke functionality of the preference management system 118. The API server 120 exposes various functions supported by the preference management system 118, including account registration; authentication and authorization functionality (e.g., access token, bearer token); transmitting data to and from a CRM system 108 to the preference management system 118; among other data exchanges described herein. According to some examples, the API server 120 exposes HTTP request methods such as: providing new consent preference(s) (e.g., POST), updating consent preference(s) (e.g., PUT), and retrieving consent preference(s) (e.g., GET).

The preference management system 118 can host multiple systems and subsystems, described below with reference to FIG. 3.

Figure 2A:
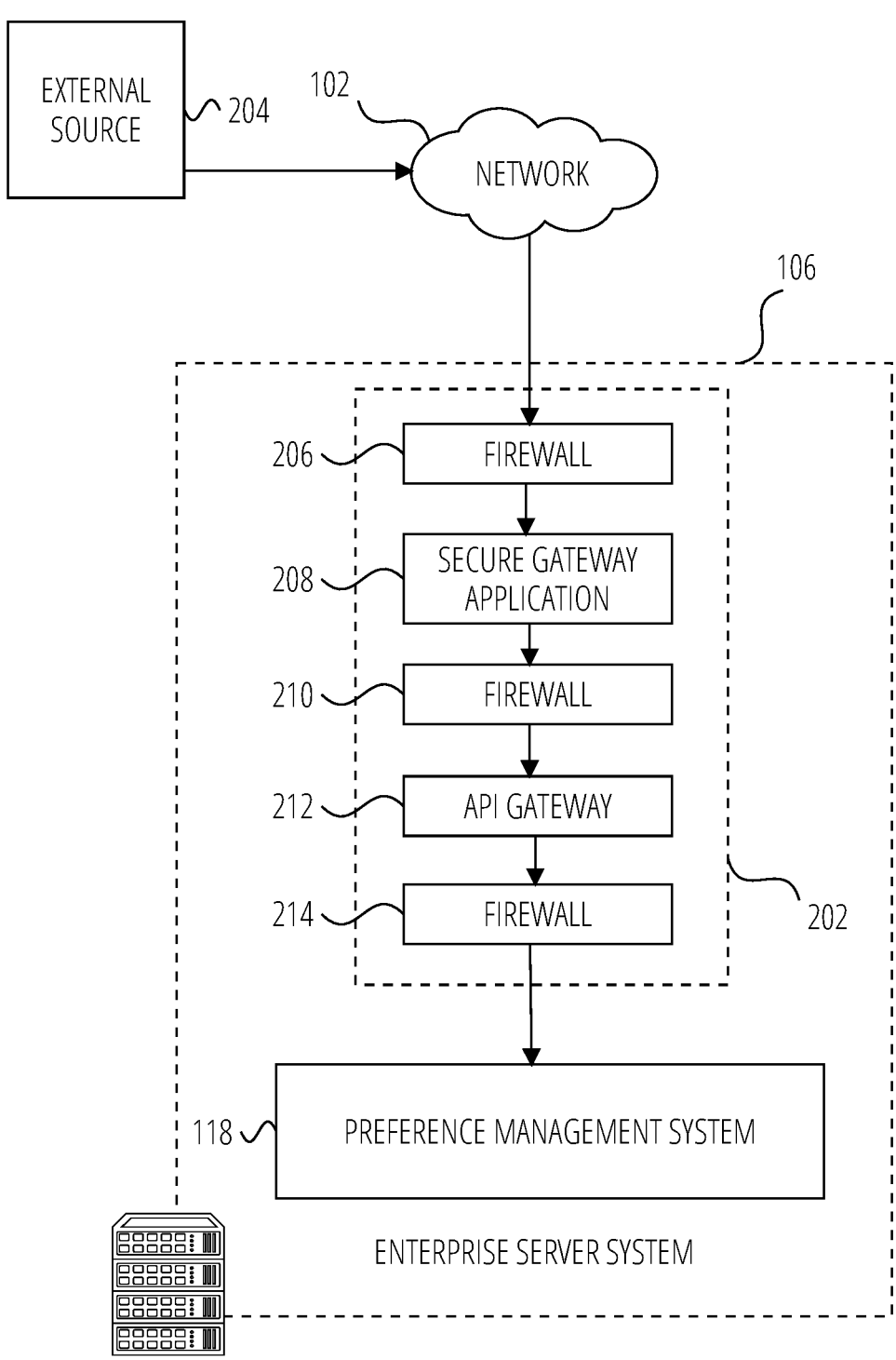
FIG. 2A is a diagrammatic representation of a networked security system for an external source, according to some examples.

FIG. 2A is a diagrammatic representation of a networked security system 202 for an external source 204, according to some examples. Securing communications is important to protecting data of clientele, such as consent preferences. The networked security system 202 may provide different security protocols for external sources 204 and internal sources.

The enterprise server system 106 receives data from the external source 204 over the network 102. The external source 204 may be a CRM system 108 or a user system 104. The network 102 may be a wide area network (WAN). Components and systems of the enterprise server system 106 may communicate over a local network, such as a local area network (LAN). The data received may be consent preference data of a client.

The data received by the enterprise server system 106 is processed through the networked security system 202, according to some examples. The networked security system 202 can include one or more firewalls 206, 210, 214 to apply predetermined security rules to incoming data. The networked security system 202 can further include a secure gateway application 208 and an API gateway 212.

The enterprise server system 106 may use multiple firewalls 206, 210, 214 for increased security. For example, the increased security can reduce successful attacks on the privacy and solicitation preferences of clients. The multiple firewalls 206, 210, 214 can create segments with different levels of trust within the local network of the enterprise server system 106. For example, each successive firewall can provide an increased level of security. Additionally, or alternatively, the multiple firewalls 206, 210, 214 can create redundancies within the local network, preventing a single point of failure during an attack or technical failure. Each of the firewalls 206, 210, 214 may be implemented as a software application (e.g., a software appliance), a hardware device (e.g., a computer appliance), or a virtual appliance that runs on a hypervisor.

The first firewall 206 may apply predetermined security rules applicable to all incoming network traffic. The first firewall 206 can be the interface between an external network (i.e., the network 102) and a local network of the enterprise server system 106. The first firewall 206 prevents unauthorized access to the enterprise server system 106. The predetermined security rules associated with the first firewall 206 may maintain an enterprise-wide access control list.

Responsive to passing through the first firewall 206, the data is received by the secure gateway application 208. The secure gateway application 208 provides security and protocol mediation to the received data. In some examples, the secure gateway application 208 provides any-to-any message transformation. The secure gateway application 208 may further provide routing capabilities to connect the external source 204 to the preference management system 118, among other systems.

After being processed by the secure gateway application 208, the data may pass through a second firewall 210. The second firewall 210 may apply predetermined security rules applicable to external API requests. The second firewall 210 may have requirements that are narrower (e.g., stricter) than those of the first firewall 206. For example, the second firewall 210 prevents unauthorized access to an API gateway 212. The predetermined security rules associated with the second firewall 210 may maintain an access control list specific to external traffic. The second firewall 210 can validate boundaries of an API gateway 212 segment of the networked security system 202 and, if the boundaries are valid, invoke the API gateway 212.

The API gateway 212 provides API management to external traffic, according to some examples. In some examples, responsive to receiving the data, the API gateway 212 may invoke one or more API calls of the API server 120, for example, to a third firewall 214.

The third firewall 214 applies predetermined privacy rules applicable to maintained data. For example, the predetermined privacy rules can be specific to preventing attacks on or tampering with the sensitive contact information maintained by the preference management system 118. The third firewall 214 may apply predetermined security rules that are narrower than those of the first firewall 206 and the second firewall 210.

The third firewall 214 validates the boundaries of a preference management system 118 segment of the networked security system 202 and, if the boundaries are valid, invokes the preference management system 118. The data is received by the preference management system 118 for further processing and persisting, as described in relation to FIG. 3.

Figure 2B:
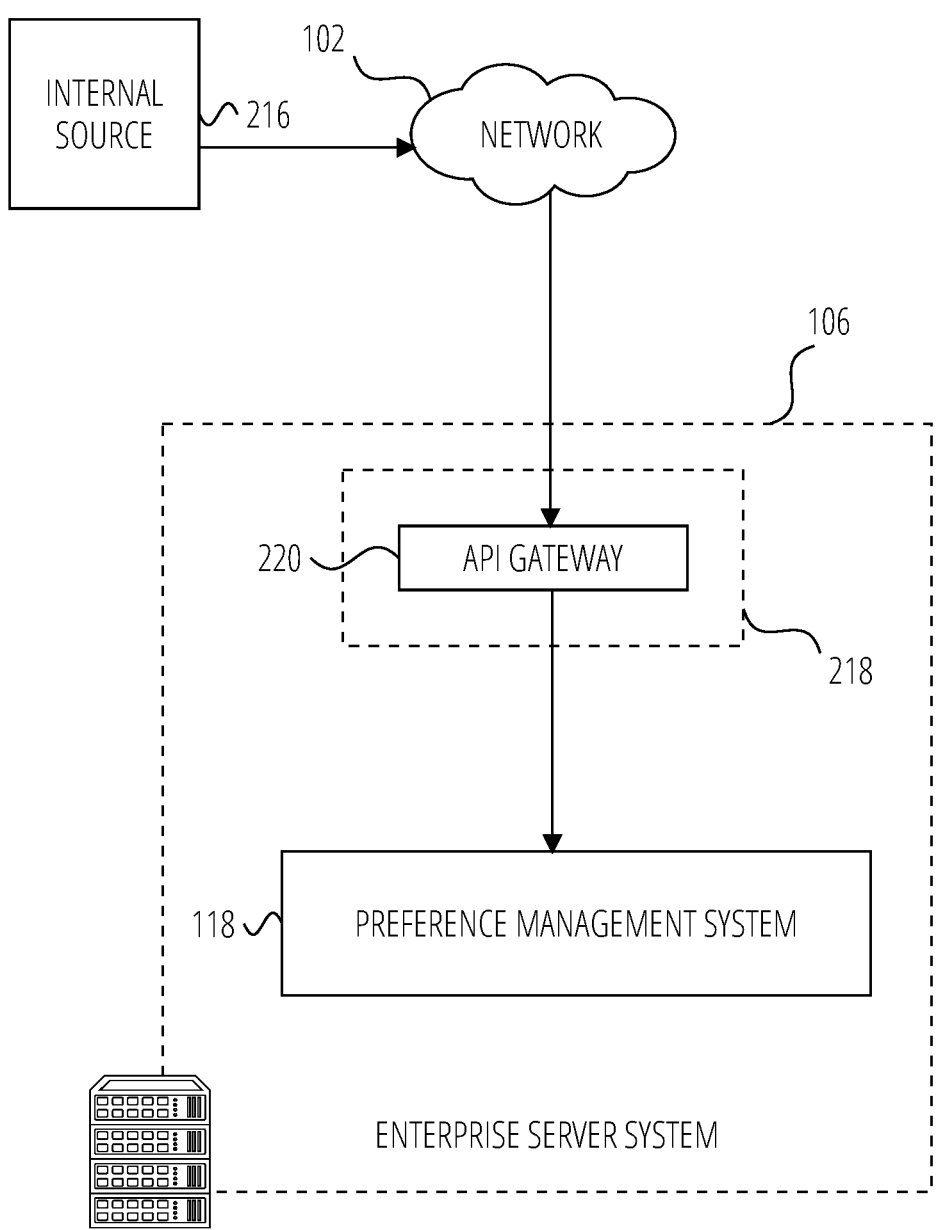
FIG. 2B is a diagrammatic representation of a networked security system for an internal source, according to some examples.

FIG. 2B is a diagrammatic representation of a networked security system 218 for an internal source 216, according to some examples. That is, data received from an internal source 216 may be processed differently than data from an external source 204, according to some examples. The networked security system 218 may comprise an example of the networked security system 202.

The enterprise server system 106 receives data from the internal source 216 over the network 102. The internal source 216 may be a CRM system 108 internal to the enterprise or a user system 104 internal to the enterprise. The network 102 may be a local area network (LAN). For data transmitted over a local network 102, such as a LAN, firewalls 206, 210, 214 may not be necessary.

The networked security system 218 comprises an API gateway 220. The data received by the enterprise server system 106 is provided to the API gateway 220 for processing. The API gateway 220 can comprise an example of the API gateway 212. According to some examples, the API gateway 220 is provides API management for internal traffic.

Figure 3:
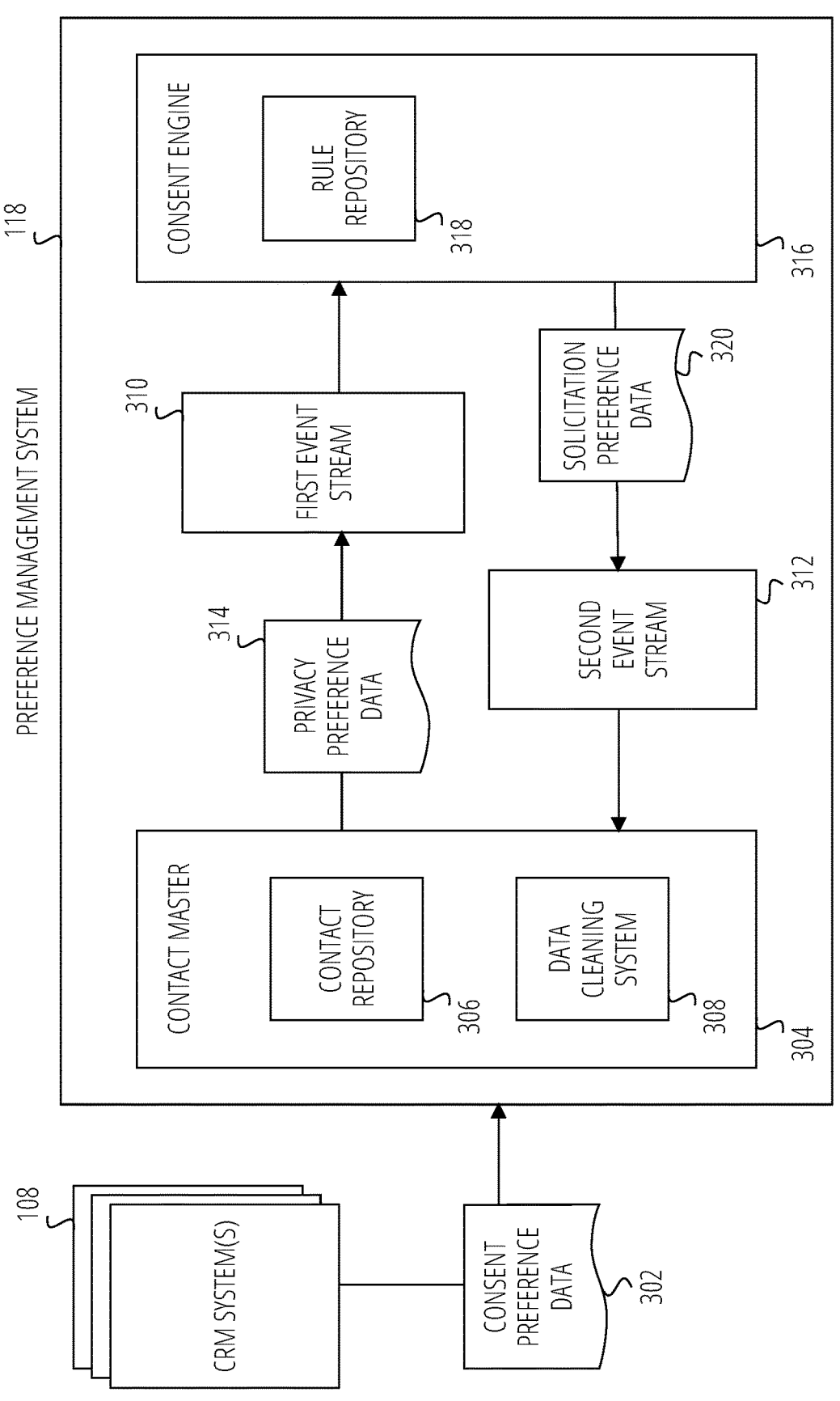
FIG. 3 is a diagrammatic representation of a preference management system, according to some examples.

FIG. 3 is a diagrammatic representation of a preference management system 118, according to some examples. The preference management system 118 receives consent preference data 302, which includes new or updated consent preferences of a client, such as an individual user or organization. The consent preference data 302 may comprise privacy preference data or solicitation preference data. For example, consent preference data 302 may comprise an indication of a client unsubscribing from a marketing email subscription. According to some examples, the consent preference data 302 is received by the preference management system 118 in JavaScript Object Notation (JSON) format.

The preference management system 118 receives consent preference data 302, for example, from the CRM systems 108. The preference management system 118 may receive a plurality of consent preference data 302 from one or more CRM systems 108, and the plurality of consent preference data 302 may be associated with a plurality of different clients. Additionally, or alternatively, the plurality of consent preference data 302 may be associated with a single client, representing one or more updates to the client's consent preferences. The consent preference data 302 may be received by the preference management system 118 from a CRM system 108 over the network 102, as depicted in FIG. 1. Additionally, or alternatively, the preference management system 118 may receive consent preference data 302 from another subsystem of the enterprise server system 106.

The preference management system 118 comprises a contact master 304 and a consent engine 316. The contact master 304 manages contact information associated with clients and prospective clients, which can include consent preferences of clients and prospective clients. The contact information managed by the contact master 304 may be maintained in a contact repository 306.

The contact repository 306 stores data associated with contact information of clients and prospective clients. The contact repository 306 can store contact information such as name of individual(s), name of organization, email, phone number, fax number, mailing address, social media handles, among other means of contacting a client or prospective client. According to some examples, each client or respective client is associated with an identification (ID) number in the contact repository 306. The contact repository 306 can store data indicating consent preferences, including privacy preferences, associated with each respective means of contact, as applicable. For example, for a particular client, the contact repository 306 may store data indicating the client does not consent to sharing their phone number and does consent to sharing their name and email.

Additionally, or alternatively, the contact repository 306 may store dates or timestamps of changes to privacy preferences, corresponding privacy policies per the time consent was acquired or denied, and a document or other reference of data through which consent was acquired or denied. According to some examples, the timestamp indicates when the client provided the new or updated privacy preferences. For example, a client provides updated privacy preferences to a CRM system 108 and the CRM system 108 provides the privacy preference data 314 to the preference management system 118 comprising the timestamp indicating the date and time the client making the update. The contact repository 306 may use one or more databases (e.g., database 124), data lakes, cloud storage, or any other form of data storage system.

Responsive to receiving the consent preference data 302, the contact master 304 cleans the consent preference data 302 using the data cleaning system 308. According to some examples, the data cleaning system 308 may identify and correct (or remove) errors or corrupted data, remove duplicates, standardize the data formatting, address missing values, and validate data against a set of rules or constraints to ensure the cleaned consent preference data 302 adheres to expected formats and value ranges. The cleaned consent preference data 302 can be stored in the contact repository 306.

Cleaned consent preference data 302 stored in the contact repository 306 provide a record of current consent preferences associated with a respective client. According to some examples, an update to consent preference data 302 writes over a prior entry in the contact repository 306, and record of the prior entry is lost. For example, important information may be inadvertently scrubbed. Additionally, or alternatively, updates to consent preferences stored in the contact repository 306 can result in duplicate entries, which may cause duplicate solicitations and create liabilities. The contact repository 306 alone is inadequate for maintaining current consent preference data 302 of clients.

To adequately address an enterprise's need to maintain accurate and current consent preferences, the preference management system 118 comprises a first event stream 310 and a second event stream 312 to persist preference data in a chronology. The contact master 304 generates privacy preference data 314 from the cleaned consent preference data 302 and writes the privacy preference data 314 to the first event stream 310. The consent engine 316 acquires the privacy preference data 314 from the first event stream 310 and applies rules to generate solicitation preference data 320, which is written to the second event stream 312. The first event stream 310 and the second event stream 312 serve as persistent storage for consent preferences, even in the event the original consent preference data 302 is written over in the contact repository 306.

Privacy preference data 314 can include data relating to a client's choices regarding collection, use, and sharing of their personal information. More generally, privacy preferences permit a client to maintain control over personal data. A client (e.g., user, organization) can manage their privacy preferences through privacy settings provided by the one or more CRM systems 108 or the enterprise (e.g., web server 126). New or updated privacy preferences are provided to the preference management system 118 as consent preference data 302. The contact master 304 generates the privacy preference data 314 from the consent preference data 302, for example, based on acquiring applicable entries in the consent preference data 302. Privacy preference data 314 may include data entries relating to:

Communication Type Preference(s): indicating whether and how a user prefers to be contacted by an organization, such as email, phone, text messages, or mail, among others. For example, a client may agree to be contacted by email and decline to be contacted by phone.

Data Collection Preference(s): indicating which types of personal data may be collected, such as contact information, location data, browsing history (e.g., browser cookie preferences), and demographic information.

Data Usage Preference(s): indicating the purposes for which the collected data may be used, such as service improvement or personalized content (e.g., targeted marketing).

Data Sharing Preference(s): indicating whether and with whom the collected data can be shared, such as third-parties or affiliates.

The contact master 304 writes (e.g., logs, publishes) privacy preference data 314 to a first event stream 310. The first event stream 310 is a stream of entries, each entry comprising privacy preference data 314 associated with a client. Each entry may further comprise a date and time-stamp. According to some examples, entries into the first event stream 310 are immutable. A first event stream 310 with immutable entries can provide a reverse-chronological stream of privacy preference data 314, enabling the preference management system 118 to efficiently determine a client's current privacy preference by referencing the current entry or entries associated with the client in the first event stream 310.

Entries into the first event stream 310 can be received by the consent engine 316. According to some examples, the contact master 304 and the consent engine 316 belong to a publisher-subscriber software architecture, where the contact master 304 is the publisher of the first event stream 310 and the consent engine 316 is the subscriber of the first event stream 310. In some examples, the first event stream 310 can be implemented using Kafka Topic, where each Topic may have one or more partitions. The privacy preference data 314 may be written to the first event stream 310 in JSON format.

Responsive to receiving cleaned consent preference data 302 from the first event stream 310, the consent engine 316 processes the privacy preference associated with a client to determine solicitation preference associated with the client by generating solicitation preference data 320. Solicitation preferences relate to a client's choices about being contacted for marketing, sales, or fundraising purposes. Solicitation preferences dictate whether and how an organization can approach a client for proportional communications. The solicitation preference data 320 may include data entries relating to:

Communication Type Solicitation Preference(s): indicating whether a client can be contacted for solicitation by particular methods of contact, such as email, phone, text messages, or mail, among others. For example, a client may agree to be solicited by email and decline to be solicited by phone.

Frequency of Solicitation Preference(s): setting limits on how often an organization can reach out for solicitation purposes.

Solicitation Content Type Preference(s): indicating whether a client is interested in receiving particular types of content, such as promotional marketing (e.g., commercial product offers, targeted marketing), fundraising content (e.g., philanthropy), informational content (e.g., newsletters), among others.

According to some examples, the consent engine 316 applies a set of rules to the privacy preference data 314 to determine solicitation preference data 320 associated with a client. The set of rules provide conditions, filters, or transformations to ascertain solicitation preference(s) associated with the client from the privacy preference(s). A rule in the set of rules may be, for example, if a client is in a region impacted by natural disaster (e.g., flood or fire), then do not send a solicitation (e.g., marketing email) That is, solicitation preference data 320 can be determined from the received privacy preference data 314.

For example, responsive to receiving a marketing email with an opt-out option, a client elects to opt-out of future emails. The preference management system 118 receives consent preference data 302 comprising an indication of the email opt-out update. The contact master 304 updates the contact repository 306 and generates privacy preference data 314 comprising an indication of an update to the communication type preferences, specifically email communication preferences, that the client opts out of email communications. The privacy preference data 314 is written to the first event stream 310, and received by the consent engine 316. The consent engine 316 applies the set of rules to determine solicitation preference data 320 comprising an indication of an update to the communication type solicitation preferences, specifically email solicitation preferences, that the client should not receive email solicitations. That is, the consent engine 316 may determine a communication type solicitation preference in solicitation preference data 320 by applying the set of rules to the communication type preference in the privacy preference data 314.

In another example, the preference management system 118 receives consent preference data 302 comprising a new phone number from a customer (e.g., a client or a representative of a client), for example, while the customer is traveling. The contact master 304 updates the contact repository 306 and generates privacy preference data 314 comprising an indication of an update to the communication type preferences, specifically phone communication preferences, replacing an old phone number with the new phone number. The privacy preference data 314 is written to the first event stream 310, and received by the consent engine 316. The consent engine 316 applies the set of rules to determine solicitation preference data 320 comprising an indication of an update to the communication type solicitation preferences, specifically phone solicitation preferences, indicating the new phone number for solicitation purposes. The consent engine 316 writes the solicitation preference data 320 to the second event stream 312. One or more CRM systems 108 may request the customer's phone solicitation preference from the preference management system 118, and in response receive the new phone number accessed from the second event stream 312. The customer may receive solicitations at the new phone number while traveling responsive to updating their privacy preferences.

In another example, the preference management system 118 receives consent preference data 302 comprising an opt-in to data usage for targeted marketing for a client. The contact master 304 generates privacy preference data 314 comprising an indication of the update to the data usage preferences, that the client opts-in for targeted advertising, which is written to the first event stream 310. The consent engine 316 applies the set of rules to the privacy preference data 314 to determine solicitation preference data 320 comprising an indication of an update to the solicitation content type preferences, that the client can receive solicitations containing targeted marketing. That is, the consent engine 316 may determine solicitation content type preferences in the solicitation preference data 320 by applying the set of rules to the data usage preferences in the privacy preference data 314.

The set of rules are managed and stored by a rule repository 318 of the consent engine 316, according to some examples. The rule repository 318 may update the set of rules responsive to a real-world event. Examples of real-world events can include weather events (e.g., hurricane, earthquake, tornado, other natural disasters or acts of God), political events (e.g., elections, changes in government or policy), economic events (e.g., major shifts in economic indicators, trade agreements), social events (e.g., public health concerns, public awareness campaigns), cultural events (e.g., arts, entertainment, sports, celebrities), scientific events (e.g., scientific discoveries, research findings, technological breakthroughs), and legal events (e.g., court rulings, changes in law), among other current events. The set of rules in the rule repository 318 may be updated automatically (e.g., triggered by keyword) or manually responsive to a real-world event.

The consent engine 316 writes the solicitation preference data 320 to a second event stream 312. The second event stream 312 can comprise an example of the first event stream 310, according to some examples. Each entry may further comprise a date and timestamp. In a publisher-subscriber architecture, the consent engine 316 is a publisher of the second event stream 312 and the contact master 304 is a subscriber. Additionally, or alternatively, the preference management system 118 is a subscriber of the second event stream 312.

A second event stream 312 with immutable entries provides a reverse-chronological stream of solicitation preference data 320, enabling the preference management system 118 to efficiently determine a client's current solicitation preference by referencing the current entry associated with the client in the second event stream 312. The preference management system 118 may determine a current entry in the second event stream 312 by referencing date and time-stamps associated with the client updating their consent preferences. That is, the current entry may differ from the most recent entry written to the second event stream 312.

Responsive to a request for consent preferences (e.g., privacy preferences, solicitation preferences), the preference management system 118 can serve the privacy preference data 314 or solicitation preference data 320, as applicable, from the first event stream 310 or second event stream 312, respectively.

For example, prior to soliciting a client, a CRM system 108 sends a request to the preference management system 118 for the solicitation preference(s) of the client. The preference management system 118 accesses the first event stream 310 and determines the current entry comprising the current privacy preference data 314 of the client. If the privacy preference data 314 of the client opts-in to data sharing with the CRM system 108, the preference management system 118 can share the privacy preference data 314 of the client. The preference management system 118 accesses the second event stream 312 and determines the current entry comprising the current solicitation preference data 320 of the client. The preference management system 118 provides the current solicitation preference data 320 to the CRM system 108 for solicitation.

The preference management system 118 provides more accurate current consent preferences associated with clients, as previously discussed. Additionally, using publisher-subscriber architecture to implement the first event stream 310 and the second event stream 312 ensures solicitation preferences are updated responsive to each update to privacy preferences. In publisher-subscriber architecture, a publisher delivers an entry to a subscriber at least once. That is, responsive to the contact master 304 writing each privacy preference data 314, the consent engine 316 receives the privacy preference data 314 at least once, triggering determination of solicitation preference data 320 at least once. Writing the solicitation preference data 320 to the second event stream 312 more than once would not impact the accuracy of the solicitation preferences maintained by the preference management system 118. The publisher-subscriber architecture of the preference management system 118 provides more accurate maintenance of consent preferences than conventional approaches, such as databases.

FIG. 4 illustrates a flowchart showing a technique 400 for preference management, according to some examples. In an example, operations of the technique 400 may be performed by processing circuitry, for example by executing instructions stored in memory. The processing circuitry may include a processor, a system on a chip, or other circuitry (e.g., wiring). For example, technique 400 may be performed by processing circuitry of a device (or one or more hardware or software components thereof), such as those illustrated and described with reference to FIG. 6. According to some examples, the operations of the technique 400 are performed by the preference management system 118.

The technique 400 includes 402 to maintain, using a first event stream, a plurality of privacy preference data from two or more CRM systems. The first event stream may be immutable and can comprise an example of the first event stream 310. The plurality of privacy preference data maintained by the first event stream may be associated with a plurality of clients. The two or more CRM systems can comprise an example of the CRM systems 108.

The technique 400 includes 404 to maintain, using a second event stream, a plurality of solicitation preference data. The second event stream may be immutable and can comprise an example of the second event stream 312. In some examples, each solicitation preference data in the plurality of solicitation preference data maintained by the second event stream is determined by applying a set of rules to filter a respective privacy preference data from the plurality of privacy preference data maintained by the first event stream. The plurality of solicitation preference data maintained by the second event stream may be associated with a plurality of clients.

The technique 400 includes 406 to receive a request for a current solicitation preference of a client. The request may be received from a subsystem of the enterprise (e.g., enterprise server system 106), a CRM (e.g., a first CRM of the two or more CRM systems), or another third-party (e.g., third-party server 110). The client may be an individual or an organization, such as a representative of the organization. The client may be a user of the user system 104. The request may be received by the API server 120 or the contact master 304 of the preference management system 118.

The technique 400 includes 408 to access one or more entries in the second event stream associated with the client. In some examples, the preference management system 118 has access to the second event stream. According to some examples, the contact master 304 is a subscriber to the second event stream or otherwise has access to the second event stream.

The technique 400 includes 410 to determine the current solicitation preference of the client from the one or more entries in the second event stream associated with the client. The preference management system 118 may determine the current solicitation preference of the client from the one or more entries in the second event stream associated with the client based on timestamps. In some examples, the timestamps indicate when the client provided the respective privacy preferences (e.g., new or updated) from which the respective solicitation preference data was determined by applying the set of rules.

The technique 400 includes 412 to provide the current solicitation preference data associated with the client. The current solicitation preference data is provided 412 to the entity that requested 410 the current solicitation preference data. For example, if a CRM system 108 requested the current solicitation preference, the preference management system 118 provides the current solicitation preference to the CRM system 108. After receiving the current solicitation preference, the entity may solicit the client based on the current solicitation preference. For example, the entity may proceed to send a marketing email to the client responsive to being permitted by the current solicitation preference of the client.

The technique 400 provides a more accurate means of managing and maintaining consent preference of clients than conventional techniques. The technique 400 can more accurately persist consent preference from multiple sources, such as a plurality of CRM systems, which reduces liability for the organization using the technique 400.

The technique 400 may include additional operations of determining a current privacy preference associated with the client based on the first event stream. According to some examples, the technique 400 at 412 further includes accessing one or more entries in the first immutable event stream associated with the client, and determining a current privacy preference of the client from the one or more entries in the first immutable event stream associated with the client, the current privacy preference comprising a data sharing preference. And, responsive to being permitted by the data sharing preference associated with the client, providing the current solicitation preference associated with the client to the requesting entity (e.g., a CRM system 108).

Additionally, or alternatively, the technique 400 may further include each entry in the one or more entries in the second event stream associated with the client comprising a timestamp indicating when the client provided the respective privacy preference data to a respective CRM system of the two or more CRM systems. According to some examples, the current solicitation preference of the client is determined from the one or more entries in the second event steam associated with the client based on determining the most recent timestamp.

Additionally, or alternatively, the technique 400 may further include, responsive to a real-world event, updating the set of rules, wherein the real-world event is one of a weather event, a political event, an economic event, a social event, a cultural event, a scientific event, or a legal event.

FIG. 5A illustrates a flowchart showing a technique 500 for preference management, according to some examples. In an example, operations of the technique 500 may be performed by processing circuitry, for example by executing instructions stored in memory. The processing circuitry may include a processor, a system on a chip, or other circuitry (e.g., wiring). For example, technique 500 may be performed by processing circuitry of a device (or one or more hardware or software components thereof), such as those illustrated and described with reference to FIG. 6. According to some examples, the operations of the technique 500 are performed by the preference management system 118. The technique 500 in FIG. 5A may comprise an example within or continuation of the technique 400 in FIG. 4.

The technique 500 includes 502 to receive privacy preference data associated with a client. The client may be an individual or an organization (or a representative of the organization). The client may provide new or updated privacy preference to an entity, such as a CRM (e.g., CRM systems 108) or an enterprise (e.g., enterprise server system 106). The preference management system 118 receives the privacy preference data from the entity. The privacy preference data may comprise a timestamp indicating a date and time of its receipt by the entity from the client. The privacy preference data may be received, for example, in JSON format. According to some examples, the privacy preference data comprises one or more of: communication type preference (e.g., email communication preference, phone communication preference, etc.), data collection preference, data usage preference, and data sharing preference.

The technique 500 includes 504 to write, to a first event stream, a first entry comprising the privacy preference data associated with the client. The first event stream may provide an immutable chronology of event entries comprising privacy preference data associated with the client or a plurality of clients. The first event stream 310 can comprise an example of the first event stream. According to some examples, the contact master 304 of the preference management system 118 writes 504 the privacy preference data to the first event stream. According to some examples, an engine (e.g., consent engine 316) receives entries of the first event stream.

The technique 500 includes 506 to apply a set of rules to the privacy preference data associated with the client to determine solicitation preference data associated with a client. The set of rules may be applied 506 by the engine. The set of rules may be stored in a repository (e.g., rule repository 318). According to some examples, solicitation preference data comprises one or more of: communication type solicitation preference (e.g., email solicitation preference, phone solicitation preference), frequency of solicitation preference, and solicitation content type preference.

The technique 500 includes 508 to write, to a second event stream, a second entry comprising the solicitation preference data associated with the client. The second event stream may provide an immutable chronology of entries comprising solicitation preference data associated with the client or a plurality of clients. The second event stream 312 can comprise an example of the second event stream. According to some examples, the engine (e.g., consent engine 316) of the preference management system 118 writes 508 the solicitation data to the second event stream. According to some examples, the, API server 120, preference management system 118, or contact master 304 receive entries of the second event stream.

The technique 500 may include additional operations of determining a current privacy preference associated with the client based on the first event stream. According to some examples, the technique 500 may include a step to store, in a repository, the privacy preference data associated with the client. The repository may maintain a plurality of privacy preference data associated with a plurality of clients. The repository may be the contact repository 306 of the preference management system 118.

Additionally, or alternatively, the technique 500 may further include, responsive to receiving the privacy preference data, cleaning the privacy preference data to standardize data formatting of the privacy preference data, and validating the cleaned privacy preference data against a set of validation rules. The data cleaning system 308 of the preference management system 118 may provide the cleaning and validating operations.

Additionally, or alternatively, the technique 500 at 502 may further include receiving, at a first firewall, a request comprising the first privacy preference data associated with the client. The first firewall may apply a first set of predetermined security rules applicable to incoming network traffic. The first firewall may comprise an example of the first firewall 206. The technique 500 at 502 may further include, responsive to being validated by the first firewall, receiving, at a first gateway, the request comprising the first privacy preference data associated with the client. The first gateway may comprise an example of the secure gateway application 208.

Additionally, or alternatively, the technique 500 at 502 may further include, responsive to being invoked by the first gateway, receiving, at a second firewall, the request comprising the first privacy preference data associated with the client. The second firewall may apply a second set of predetermined security rules applicable to external requests, the second predetermined security rules being narrower than the first set of predetermined security rules. The second firewall may comprise an example of the second firewall 210. The technique 500 at 502 may further include responsive to being validated by the second firewall, receiving, at a second gateway, the request comprising the first privacy preference data associated with the client. The second gateway may comprise an example of the API gateway 212.

Additionally, or alternatively, the technique 500 at 502 may further include, responsive to being invoked by the second gateway, receiving, at a third firewall, the request comprising the first privacy preference data associated with the client. The third firewall may apply a third set of predetermined security rules applicable to maintained data, the third predetermined security rules being narrower than the second set of predetermined security rules. The third firewall may comprise an example of the third firewall 214. The technique 500 at 502 may further include, responsive to being validated by the third firewall, receiving the first privacy preference data associated with the client, for example, at the contact master 304 of the preference management system 118.

Additionally, or alternatively, the technique 500 at 506 may further include determining communication type solicitation preference comprised in the solicitation preference data by applying the set of rules to communication type preference comprised in the privacy preference data. For example, an email solicitation preference may be determined by applying the set of rules to filter email communication preference in the privacy preference data.

Additionally, or alternatively, the technique 500 at 506 may further include determining solicitation content type preference comprised in the solicitation preference data by applying the set of rules to the data usage preference comprised in the privacy preference data. For example, a targeted marketing solicitation content preference may be determined by applying the set of rules to filter targeted marketing privacy preferences.

FIG. 5B illustrates a flowchart showing a technique 510 for preference management, according to some examples. The technique 510 can comprise a continuation of the technique 500 of FIG. 5A.

After 508 of technique 500, the technique 510 can include 512 to receive second privacy preference data associated with the client. The second privacy preference data received at 512 can comprise an example of the first privacy preference data received at 502. For example, the preference management system 118 can receive the second privacy preference data from the same entity as 502. Alternatively, the preference management system 118 can receive 512 the second privacy preference data from a different entity. In some examples, the first privacy preference data is received 502 from a first CRM system, and the second privacy preference data is received 512 from a second CRM system, the second CRM system being distinct from the first CRM system.

The technique 510 can include 514 to write, to the first event stream, a third entry comprising the second privacy preference data associated with the client. Writing 514 may comprise an example of the writing 504 of technique 500. According to some examples, the contact master 304 of the preference management system 118 writes 514 the second privacy preference data to the first event stream.

The technique 510 can include 516 to apply the set of rules to the second privacy preference data associated with the client to determine second solicitation preference data associated with the client. The second solicitation preference data may comprise an example of the first solicitation preference data.

The technique 510 can include 518 to write, to the second event stream, a fourth entry comprising the second solicitation preference data associated with the client. Writing at step 518 may comprise an example of the writing at step 508. According to some examples, an engine (e.g., consent engine 316) writes 518 the second solicitation preference data to the second event stream.

According to some examples, the technique 510 can continue after 518 to technique 400 at 406, followed by determining a current solicitation preference associated with the client based on the second event stream. In some such examples, the preference management system 118 determines whether the first solicitation preference data or the second solicitation preference data is current by referencing date and timestamps associated with the client making the associated edit to their consent preferences that caused the preference management system 118 to receive 502, 512 the respective privacy preference data. For example, the second solicitation preference data can be the current solicitation preference of the client.

Figure 6:
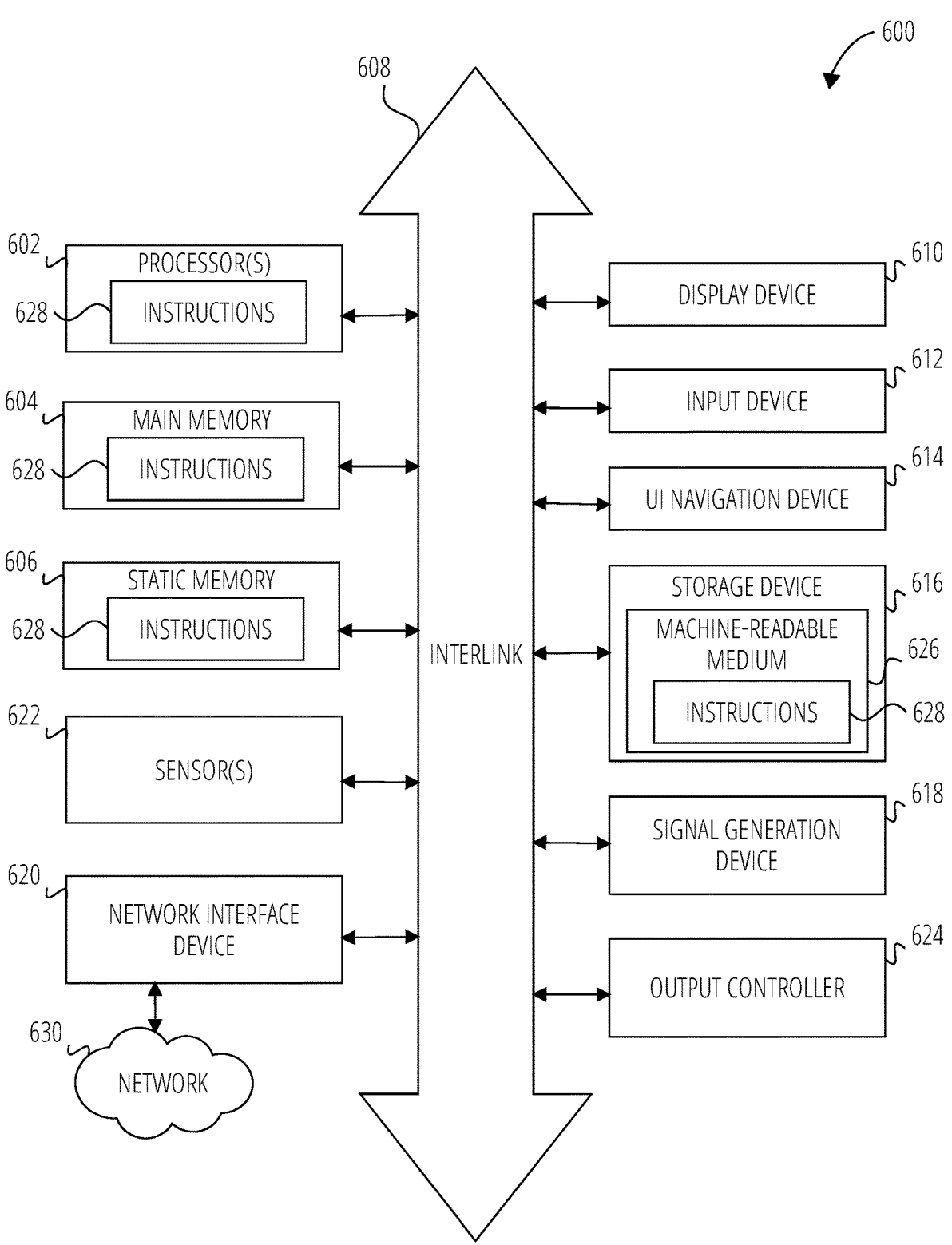
FIG. 6 illustrates generally an example of a block diagram of a machine upon which any one or more of the techniques discussed herein may perform in accordance with some examples.

FIG. 6 illustrates generally an example of a block diagram of a machine 600 upon which any one or more of the techniques (e.g., methodologies) discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor(s) 602 (e.g., a CPU, a GPU, a hardware processor core, or any combination thereof), a main memory 604 and a static memory 606, some or all of which may communicate with each other via an interlink 608 (e.g., a bus). The machine 600 may further include a display device 610, an alphanumeric input device 612 (e.g., a keyboard), and a UI navigation device 614 (e.g., a mouse). In an example, the display device 610, alphanumeric input device 612 and UI navigation device 614 may be a touch screen display. The machine 600 may additionally include a storage device 616 (e.g., drive unit), a signal generation device 618 (e.g., a speaker), a network interface device 620, and one or more sensor(s) 622, such as a global positioning system (GPS) sensor, compass, accelerometer, or other sensor. The machine 600 may include an output controller 624, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable machine-readable medium 626 that is non-transitory on which is stored one or more sets of data structures or instructions 628 (e.g., software) embodying or utilized by any one or more of the techniques or functions described herein. The instructions 628 may also reside, completely or at least partially, within the main memory 604, within static memory 606, or within the hardware processor(s) 602 during execution thereof by the machine 600. In an example, one or any combination of the hardware processor(s) 602, the main memory 604, the static memory 606, or the storage device 616 may constitute machine readable media.

While the machine readable machine-readable medium 626 is illustrated as a single medium, the term "machine readable medium" may include a single medium or multiple media (e.g., a centralized or distributed database, or associated caches and servers) configured to store the one or more instructions 628.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 628 may further be transmitted or received over a communications network 630 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 630. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The following, non-limiting examples, detail certain aspects of the present subject matter to solve the challenges and provide the benefits discussed herein, among others.

Example 1 is a method comprising: maintaining, using a first immutable event stream, a plurality of privacy preference data from two or more customer relationship manage-ment (CRM) systems; maintaining, using a second immutable event stream, a plurality of solicitation preference data, each solicitation preference data in the plurality of solicitation preference data determined by applying a set of rules to filter a respective privacy preference data from the plurality of privacy preference data maintained by the first immutable event stream; receiving, from a first CRM system of the two or more CRM systems, a request for a current solicitation preference of a client; accessing one or more entries in the second immutable event stream associated with the client; determining the current solicitation preference of the client from the one or more entries in the second immutable event stream associated with the client; and providing, to the first CRM system, the current solicitation preference associated with the client.

In Example 2, the subject matter of Example 1 includes, wherein the current solicitation preference is a current email solicitation preference indicating whether the client has agreed to be solicited by email.

In Example 3, the subject matter of Examples 1-2 includes, receiving first privacy preference data associated with the client from the first CRM system; writing, to the first immutable event stream, a first entry comprising the first privacy preference data associated with the client; applying the set of rules to the first privacy preference data to determine first solicitation preference data associated with the client; and writing, to the second immutable event stream, a second entry comprising the first solicitation preference data associated with the client.

In Example 4, the subject matter of Example 3 includes, receiving second privacy preference data associated with the client from a second CRM system of the two or more CRM systems, the second CRM system being distinct from the first CRM system; writing, to the first immutable event stream, a third entry comprising the second privacy preference data associated with the client; applying the set of rules to the second privacy preference data to determine second solicitation preference data associated with the client; and writing, to the second immutable event stream, a fourth entry comprising the second solicitation preference data associated with the client, the second solicitation preference data being the current solicitation preference of the client.

In Example 5, the subject matter of Examples 3-4 includes, wherein receiving the first privacy preference data associated with the client comprises: receiving, at a first firewall, a request comprising the first privacy preference data associated with the client; responsive to being validated by the first firewall, receiving, at a first gateway, the request comprising the first privacy preference data associated with the client; responsive to being invoked by the first gateway, receiving, at a second firewall, the request comprising the first privacy preference data associated with the client; responsive to being validated by the second firewall, receiving, at a second gateway, the request comprising the first privacy preference data associated with the client; responsive to being invoked by the second gateway, receiving, at a third firewall, the request comprising the first privacy preference data associated with the client; and responsive to being validated by the third firewall, receiving the first privacy preference data associated with the client.

In Example 6, the subject matter of Example 5 includes, wherein each of the first firewall, the second firewall, and the third firewall apply respective predetermined security rules to incoming data, wherein the first firewall applies first predetermined security rules applicable to incoming network traffic, wherein the second firewall applies second predetermined security rules applicable to external requests, the second predetermined security rules being narrower than the first predetermined security rules, and wherein the third firewall applies third predetermined security rules applicable to maintained data, the third predetermined security rules being narrower than the second predetermined security rules.

In Example 7, the subject matter of Examples 1-6 includes, wherein each entry in the one or more entries in the second immutable event stream associated with the client comprise a timestamp indicating when the client provided the respective privacy preference data to a respective CRM system of the two or more CRM systems, and wherein the current solicitation preference of the client is determined from the one or more entries in the second immutable event stream associated with the client based on determining a most recent timestamp.

In Example 8, the subject matter of Examples 1-7 includes, wherein privacy preference data comprises one or more of: communication type preference, data collection preference, data usage preference, and data sharing preference.

In Example 9, the subject matter of Example 8 includes, wherein solicitation preference data comprises one or more of: communication type solicitation preference, frequency of solicitation preference, and solicitation content type preference.

In Example 10, the subject matter of Examples 1-9 includes, accessing one or more entries in the first immutable event stream associated with the client; determining a current privacy preference of the client from the one or more entries in the first immutable event stream associated with the client, the current privacy preference comprising a data sharing preference; and responsive to being permitted by the data sharing preference associated with the client, providing the current solicitation preference associated with the client to the first CRM system.

In Example 11, the subject matter of Examples 1-10 includes, responsive to a real-world event, updating the set of rules, wherein the real-world event is one of a weather event, a political event, an economic event, a social event, a cultural event, a scientific event, or a legal event.

Example 12 is a system comprising: processing circuitry; and memory, including instructions, which when executed by the processing circuitry, causes the processing circuitry to perform operations to: maintain, using a first immutable event stream, a plurality of privacy preference data from two or more customer relationship management (CRM) systems; maintain, using a second immutable event stream, a plurality of solicitation preference data, each solicitation preference data in the plurality of solicitation preference data determined by applying a set of rules to filter a respective privacy preference data from the plurality of privacy preference data maintained by the first immutable event stream; receive, from a first CRM system of the two or more CRM systems, a request for a current solicitation preference of a client; access one or more entries in the second immutable event stream associated with the client; determine the current solicitation preference of the client from the one or more entries in the second immutable event stream associated with the client; and provide, to the first CRM system, the current solicitation preference associated with the client.

In Example 13, the subject matter of Example 12 includes, wherein the current solicitation preference is a current email solicitation preference indicating whether the client has agreed to be solicited by email.

In Example 14, the subject matter of Examples 12-13 includes, wherein the instructions further cause the processing circuitry to: receive first privacy preference data associated with the client from the first CRM system; write, to the first immutable event stream, a first entry comprising the first privacy preference data associated with the client; apply the set of rules to the first privacy preference data to determine first solicitation preference data associated with the client; and write, to the second immutable event stream, a second entry comprising the first solicitation preference data associated with the client.

In Example 15, the subject matter of Example 14 includes, wherein the instructions further cause the processing circuitry to: receive second privacy preference data associated with the client from a second CRM system of the two or more CRM systems, the second CRM system being distinct from the first CRM system; write, to the first immutable event stream, a third entry comprising the second privacy preference data associated with the client; apply the set of rules to the second privacy preference data to determine second solicitation preference data associated with the client; and write, to the second immutable event stream, a fourth entry comprising the second solicitation preference data associated with the client, the second solicitation preference data being the current solicitation preference of the client.

In Example 16, the subject matter of Examples 14-15 includes, wherein receiving the first privacy preference data associated with a client comprises: receive, at a first firewall, a request comprising the first privacy preference data associated with the client; responsive to being validated by the first firewall, receive, at a first gateway, the request comprising the first privacy preference data associated with the client; responsive to being invoked by the first gateway, receive, at a second firewall, the request comprising the first privacy preference data associated with the client; responsive to being validated by the second firewall, receive, at a second gateway, the request comprising the first privacy preference data associated with the client; responsive to being invoked by the second gateway, receive, at a third firewall, the request comprising the first privacy preference data associated with the client; and responsive to being validated by the third firewall, receive the first privacy preference data associated with the client.

In Example 17, the subject matter of Example 16 includes, wherein each of the first firewall, the second firewall, and the third firewall apply respective predetermined security rules to incoming data, wherein the first firewall applies first predetermined security rules applicable to incoming network traffic, wherein the second firewall applies second predetermined security rules applicable to external requests, the second predetermined security rules being narrower than the first predetermined security rules, and wherein the third firewall applies third predetermined security rules applicable to maintained data, the third predetermined security rules being narrower than the second predetermined security rules.

In Example 18, the subject matter of Examples 12-17 includes, wherein each entry in the one or more entries in the second immutable event stream associated with the client comprise a timestamp indicating when the client provided the respective privacy preference data to a respective CRM system of the two or more CRM systems, and wherein the current solicitation preference of the client is determined from the one or more entries in the second immutable event stream associated with the client based on determining a most recent timestamp.

Example 19 is a non-transitory computer-readable storage medium, the non-transitory computer-readable storage medium including instructions that when executed by a computer, cause the computer to: maintain, using a first immutable event stream, a plurality of privacy preference data from two or more customer relationship management (CRM) systems; maintain, using a second immutable event stream, a plurality of solicitation preference data, each solicitation preference data in the plurality of solicitation preference data determined by applying a set of rules to filter a respective privacy preference data from the plurality of privacy preference data maintained by the first immutable event stream; receive, from a first CRM system of the two or more CRM systems, a request for a current solicitation preference of a client; access one or more entries in the second immutable event stream associated with the client; determine the current solicitation preference of the client from the one or more entries in the second immutable event stream associated with the client; and provide, to the first CRM system, the current solicitation preference associated with the client.

In Example 20, the subject matter of Example 19 includes, wherein the current solicitation preference is a current email solicitation preference indicating whether the client has agreed to be solicited by email.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
   maintaining, using a first event stream with immutable entries published by a contact master component, a plurality of privacy preference data entries derived from two or more customer relationship management (CRM) systems, wherein the immutable entries in the first event stream have timestamps identifying when a client provided respective privacy preference data to a respective CRM system;
   maintaining, using a second event stream with immutable entries published by a consent engine subscribed to the first event stream, a plurality of solicitation preference data, each solicitation preference data in the plurality of solicitation preference data including a timestamp, and each solicitation preference data determined by the consent engine by applying a set of rules to filter a respective privacy preference data from the plurality of privacy preference data published by the contact master component in the first event stream wherein the consent engine receives each privacy preference data from the first event stream at least once responsive to the contact master component writing each privacy preference data to the first event stream;
   responsive to receiving privacy preference data from the first event stream, the consent engine applies a set of rules to the received privacy preference data to determine solicitation preference data and publishes the solicitation preference data to the second event stream;
   receiving, from a first CRM system of the two or more CRM systems, a request for a current solicitation preference of a client;
   accessing one or more immutable entries in the second event stream associated with the client;
   determining the current solicitation preference of the client from the immutable entries in the second event stream associated with the client based on determining a most recent timestamp of the immutable entries in the second event stream; and
   providing, to the first CRM system, the current solicitation preference associated with the client.

2. The method of claim 1, wherein the current solicitation preference is a current email solicitation preference indicating whether the client has agreed to be solicited by email.

3. The method of claim 1, further comprising:
   receiving first privacy preference data associated with the client from the first CRM system;
   writing, to the first event stream, a first entry comprising the first privacy preference data associated with the client;
   applying the set of rules to the first privacy preference data to determine first solicitation preference data associated with the client; and
   writing, to the second event stream, a second entry comprising the first solicitation preference data associated with the client.

4. The method of claim 3, further comprising:
   receiving second privacy preference data associated with the client from a second CRM system of the two or more CRM systems, the second CRM system being distinct from the first CRM system;
   writing, to the first event stream, a third entry comprising the second privacy preference data associated with the client;
   applying the set of rules to the second privacy preference data to determine second solicitation preference data associated with the client; and
   writing, to the second event stream, a fourth entry comprising the second solicitation preference data associated with the client, the second solicitation preference data being the current solicitation preference of the client.

5. The method of claim 1, wherein privacy preference data comprises one or more of: communication type preference, data collection preference, data usage preference, and data sharing preference.

6. The method of claim 5, wherein solicitation preference data comprises one or more of: communication type solicitation preference, frequency of solicitation preference, and solicitation content type preference.

7. The method of claim 1, further comprising:

accessing one or more entries in the first event stream associated with the client, determining a current privacy preference of the client from the one or more entries in the first event stream associated with the client, the current privacy preference comprising a data sharing preference; and responsive to being permitted by the data sharing preference associated with the client, providing the current solicitation preference associated with the client to the first CRM system.

8. The method of claim 1, further comprising:

responsive to a real-world event, updating the set of rules, wherein the real-world event is one of a weather event, a political event, an economic event, a social event, a cultural event, a scientific event, or a legal event.

9. A system comprising:

processing circuitry; and memory, including instructions, which when executed by the processing circuitry, causes the processing circuitry to perform operations to:

maintain, using a first event stream with immutable entries published by a contact master component, a plurality of privacy preference data entries derived from two or more customer relationship management (CRM) systems, wherein the immutable entries in the first event stream have timestamps identifying when a client provided respective privacy preference data to a respective CRM system;

maintain, using a second event stream with immutable entries published by a consent engine subscribed to the first event stream, a plurality of solicitation preference data, each solicitation preference data in the plurality of solicitation preference data including a timestamp, and each solicitation preference data determined by the consent engine by applying a set of rules to filter a respective privacy preference data from the plurality of privacy preference data published by the contact master component in the first event stream wherein the consent engine receives each privacy preference data from the first event stream at least once responsive to the contact master component writing each privacy preference data to the first event stream;

responsive to receiving privacy preference data from the first event stream, the consent engine applies a set of rules to the received privacy preference data to determine solicitation preference data and publishes the solicitation preference data to the second event stream;

receive, from a first CRM system of the two or more CRM systems, a request for a current solicitation preference of a client;

access one or more immutable entries in the second event stream associated with the client;

determine the current solicitation preference of the client from the immutable entries in the second event stream associated with the client based on determining a most recent timestamp of the immutable entries in the second event stream; and provide, to the first CRM system, the current solicitation preference associated with the client.

10. The system of claim 9, wherein the current solicitation preference is a current email solicitation preference indicating whether the client has agreed to be solicited by email.

11. The system of claim 9, wherein the instructions further cause the processing circuitry to:

receive first privacy preference data associated with the client from the first CRM system;

write, to the first event stream, a first entry comprising the first privacy preference data associated with the client;

apply the set of rules to the first privacy preference data to determine first solicitation preference data associated with the client; and write, to the second event stream, a second entry comprising the first solicitation preference data associated with the client.

12. The system of claim 11, wherein the instructions further cause the processing circuitry to:

receive second privacy preference data associated with the client from a second CRM system of the two or more CRM systems, the second CRM system being distinct from the first CRM system;

write, to the first event stream, a third entry comprising the second privacy preference data associated with the client;

apply the set of rules to the second privacy preference data to determine second solicitation preference data associated with the client; and write, to the second event stream, a fourth entry comprising the second solicitation preference data associated with the client, the second solicitation preference data being the current solicitation preference of the client.

13. A non-transitory computer-readable storage medium, the non-transitory computer-readable storage medium including instructions that when executed by a computer, cause the computer to:

maintain, using a first event stream with immutable entries published by a contact master component, a plurality of privacy preference data entries derived from two or more customer relationship management (CRM) systems, wherein the immutable entries in the first event stream have timestamps identifying when a client provided respective privacy preference data to a respective CRM system;

maintain, using a second event stream with immutable entries published by a consent engine subscribed to the first event stream, a plurality of solicitation preference data, each solicitation preference data in the plurality of solicitation preference data including a timestamp, and each solicitation preference data determined by the consent engine by applying a set of rules to filter a respective privacy preference data from the plurality of privacy preference data published by the contact master component in the first event stream wherein the consent engine receives each privacy preference data from the first event stream at least once responsive to the contact master component writing each privacy preference data to the first event stream;

responsive to receiving privacy preference data from the first event stream, the consent engine applies a set of rules to the received privacy preference data to determine solicitation preference data and publishes the solicitation preference data to the second event stream;

receive, from a first CRM system of the two or more CRM systems, a request for a current solicitation preference of a client;

access one or more immutable entries in the second event stream associated with the client;

determine the current solicitation preference of the client from the immutable entries in the second event stream associated with the client based on determining a most recent timestamp of the immutable entries in the second event stream; and provide, to the first CRM system, the current solicitation preference associated with the client.

14. The non-transitory computer-readable storage medium of claim 13, wherein the current solicitation preference is a current email solicitation preference indicating whether the client has agreed to be solicited by email.

\* \* \* \* \*